3,548,216
CAPACITOR COMMUTATED CIRCUITS
WHEREIN CHARGE IS DISSIPATED
AFTER COMMUTATION
Derek E. Burch, London, England, assignor to Westinghouse Brake and Signal Company, Limited, London, England
Filed Jan. 29, 1968, Ser. No. 701,255
Claims priority, application Great Britain, Feb. 17, 1967, 7,762/67
Int. Cl. H03k 17/00
U.S. Cl. 307—252                7 Claims

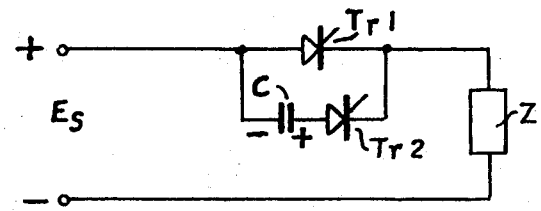
Fig. 1.
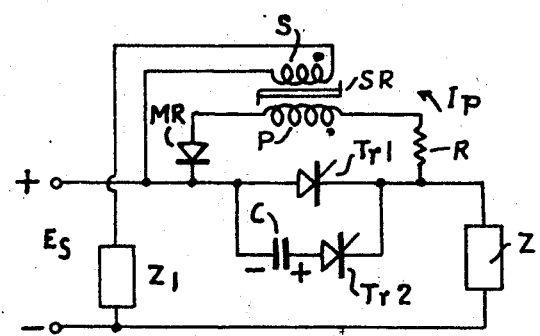
Fig. 2.
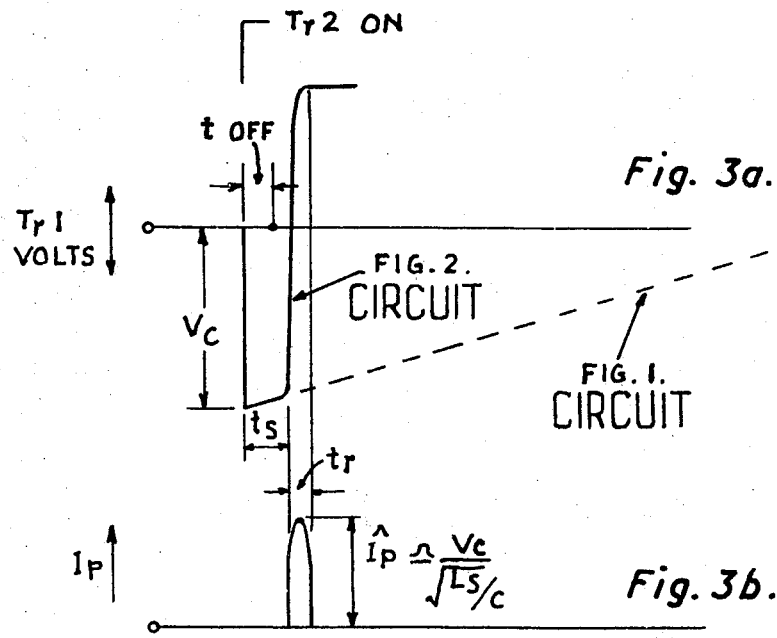
Fig. 3a.
Fig. 3b.

ABSTRACT OF THE DISCLOSURE

A control circuit for a controllable rectifier device includes a first path which is rendered conductive to apply a reverse voltage to the device to render the device non-conducting, a capacitor included in this path storing the reverse voltage. A second selectively conductive path includes a saturable reactor which, responsive to the first path being rendered conductive, times an interval greater than the interval necessary for the reverse voltage to render the rectifier device non-conducting, the saturable reactor rendering the second path conductive at the end of this timed interval so as to dissipate charge from the capacitor.

---

This invention relates to capacitor-commutated circuits and relates in particular to controllable rectifier circuits which employ a capacitor switchable across a portion of a current path between a source and a load to commutate a controllable rectifier in the path into the non-conducting condition.

According to the present invention there is provided a controllable rectifier circuit arrangement including a controllable rectifier device between a source and a load circuit which may be rendered conducting in the forward direction on application of a triggering signal thereto and may subsequently be rendered non-conducting by the application of a reverse bias from a commutating capacitor to a portion of the circuit including the device to reduce the current in the device to below a sustaining value for sufficient time for the device to regain its blocking capability, a current path being provided via which after a predetermined time following application of the said bias said capacitor may be discharged via other than the load circuit to reduce the load voltage regulation due to the capacitor voltage.

As in the case of many forms of circuit supplying a load from a source, certain capacitor-commutated circuits have been found to have voltage regulation which is related to the load current but it has been found in this case that this regulation is largely due to the presence of the commutating capacitor. By providing the said current path via which the capacitor may be discharged after a predetermined time, it is possible to improve the regulation for low values of load without any increase in the value of capacitance required for commutating the full load current, or substantial decrease in circuit efficiency at full load.

Said current path may be provided by a saturable reactor in series with a unilaterally conductive device connected across said portion of the circuit including the device to be commutated, the saturable reactor being suitably biased to be non-conducting for said predetermined time.

A resistor may also be connected in the said current path to reduce the tendency of resonant voltage build up on the capacitor during each commutation.

Figure 4:
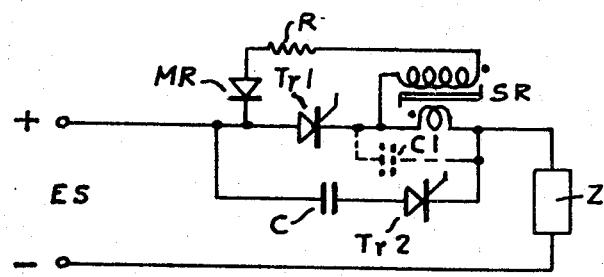
Figure 5:
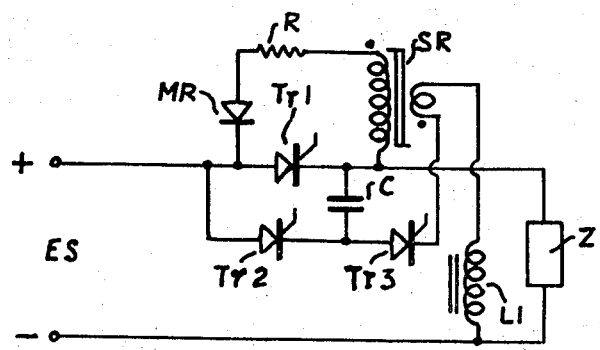
Figure 6:
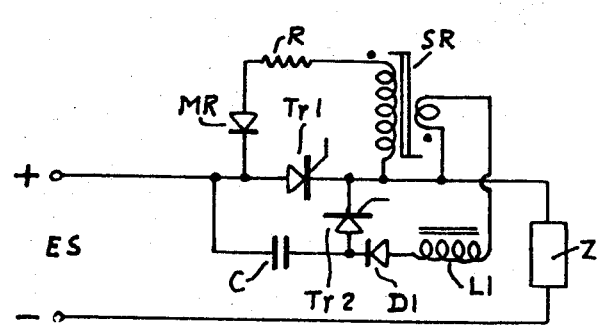
Figure 7:
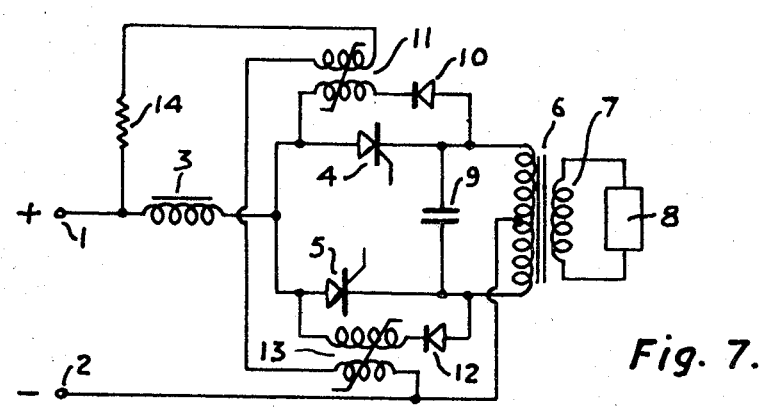

In order that the present invention may be more clearly understood and readily carried into effect, the same will be further described by way of example with reference to the accompanying drawings in which:

FIG. 1 illustrates a basic commutation circuit;
FIG. 2 illustrates the basic circuit with an improvement according to the invention;
FIG. 3 illustrates graphically the effect of the improvement of FIG. 2;
FIG. 4 illustrates a modification of FIG. 2;
FIG. 5 and FIG. 6 illustrate the application of the invention to other forms of commutation circuit and
FIG. 7 illustrates an application of the invention to a parallel inverter circuit.

Referring to FIG. 1, a D.C. supply source represented by $E_s$ is connectable to a load Z via a semiconductor controllable rectifier device TR1 this device being a device of the type which is rendered conducting on application of a triggering signal thereto and is subsequently rendered non-conducting by the current therein being rendered below a sustaining value for a predetermined turn-off time. The turn-off is achieved by switching a suitably charged commutating capacitor C across the device via a further controllable device Tr2.

Considering now the operation of this circuit in greater detail, the capacitor C is charged to a voltage $V_c$ of the polarity indicated in FIG. 1. The circuit means by which this charge is achieved are not shown as it depends on the type of circuit chosen. However, as examples, the capacitor may be charged by a circuit as disclosed in the specification of British Pat. No. 968,512. When Tr2 is switched ON the voltage $V_c$ is applied across Tr1 with suitable polarity to turn it OFF. If the load were resistive then capacitor C would be discharged from $-V_c$ towards the voltage of the source $+E_s$, according to an exponential curve, and if the load were very inductive, with free-wheeling diode, then the discharge would be linear at the constant current rate of the load current at turn-off. Therefore, with both resistive and inductive loads the discharge of C takes a substantial time at light loads, as illustrated by the dotted anode-cathode voltage waveform shown in FIG. 3(a). This increasing voltage-time area, causes an increase in the load voltage as the load current is reduced; this is because the capacitor voltage $V_c$ is in series-aiding with the supply voltage $E_s$ when Tr1 ceased to conduct.

The circuit shown will commutate so long as the magnitude of load current is not sufficient to reduce the voltage across Tr1 to zero in a time equal to or less than the turn-off time $t_{off}$ of the thyristor Tr1.

Referring to the improved circuit of FIG. 2, embodying the invention, in parallel with the series combination of the commutating capacitor and the device Tr2 there is connected a series combination of a resistor R, a saturable reactor winding P of a reactor SR and a diode MR. A saturating winding S or SR is connected across the supply $E_s$ via a current limiting impedance $Z_1$.

The saturable reactor SR in FIG. 2, has a square-loop core material which is biased at saturation flux density in one direction, say, $-B_s$, by a constant current flowing in winding S. The constant current is provided by impedance Z1. When Tr2 conducts the saturable reactor SR is designed to support the capacitor voltage $V_c$ for a time $t_s$ before it saturates. Then, at saturation, the capacitor voltage is reversed rapidly in a time $tr$ which is determined by the saturated inductance of SR, namely, $L_s$, according to the approximate relationship $t_r$ $L_sC$. During this reversal time $t_r$ an approximate half sinusoidal current pulse $I_p$ flows through R, SR and MR as shown in FIG. 3(b). In this operation the core material of SR is taken from saturation in one direction $(-B_s)$ to saturation in the opposite direction $(+B_s)$. The bias current flowing in winding S now resets the core to $-B_s$ (by providing more than twice the coercive force of the particular core) ready for the next commutation.

It is necessary for the saturation time $t_s$ to be somewhat longer than the turn-off time $t_{off}$ of device $Tr1$.

The value of saturated inductance $L_s$ is such as to limit the peak value of the current pulses $I_p$ and to control $dv/dt$, the rate of re-applied forward voltage.

The resistor R may be necessary to introduce losses in reversing the capacitor voltage and so prevent the build-up of voltage $V_c$ which could occur with some types of commutation circuit when operated repetitively.

At full-load the reverse voltage across $Tr1$ falls to zero in a time just greater than $t_{off}$ without saturating SR an so only a negligibly small current due to the high unsaturated inductance flows through R, SR, and MR during the time of reverse voltage across $Tr1$. Therefore no increase in capacitor value is necessary to commutate the full-load current when using the proposed improvement in forced commutation circuits.

By employing an improved commutation circuit as outlined in the foregoing it may be appreciated that the following advantages may be obtained:

(a) Improvement of the output voltage regulation by reducing the voltage soaring at light-loads.
(b) Reduction of the range of duty-ratio control required, as it may not be necessary to operate at such a low duty-ratio to achieve the minimum load voltage or current required.
(c) Increase of the possible switching frequency as normally the light-load discharge time of the commutating capacitor would limit the operating frequency.
(d) Prevention of failure of forced commutation circuits where the capacitor must have completed its discharge or charge-reversal, before the end of the OFF period (i.e. in some circuits employing the arrangement of FIG. 2, $Tr2$ must have extinguished before $Tr1$ is allowed to conduct again).

Although in the foregoing description of the invention, a constant current source is employed for resetting the saturable reactor SR, other methods of achieving this may be employed as illustrated by way of example in FIGS. 4, 5, and 6.

In the arrangement of FIG. 4, reset of the saturable reactor is achieved by a reset winding of few turns in series with the load. The saturable reactor thus also limits the $di/dt$ of current in the device $Tr1$ when $Tr1$ is rendered conducting. The capacitor Cl, indicated as dotted, may be provided if necessary to include a shunt path for the pulse of reverse recovery current to prevent it prematurely magnetising the core of the saturable reactor.

Reset of the saturable reactor SR may alternatively be provided by the aforementioned half-sinusoidal pulse of current in the charging or charge reversal paths of the commutating capacitor as the case may be, according to the form of basic circuit employed.

Thus, in FIG. 5, there is shown an improvement according to the invention as applied to the form of commutation circuit described in the specification of copending patent application No. 52,560/65 and which is employed in a converter circuit described in copending patent applicaton No. 3,528/67. The controllable rectifier device TR3 is rendered conducting by a triggering signal from a suitable driver circuit at the same instant as the device TR1. This provides a charging path for the capacitor C to the correct polarity for subsequently turning off the device TR1 on triggering of the device TR2. Triggering of TR3 thus provides charges for capacitor C via the reset winding of SR.

Again, there is shown in FIG. 6 an improvement according to the invention as applied to a previously known so-called charge reversal cathode pulse turn-off type of circuit. On triggering the device TR1, the charge left on capacitor C after turn-off of device TR1 is reversed via D1, the series choke L1 and the reset winding of SR to leave the correct charge on C for turning TR1 off when TR2 is next triggered.

Referring now to the inverter as shown in FIG. 7, supply terminals 1 and 2 are assumed to be connected to a D.C. supply source with the polarity shown. The terminal 1 is connected via a series choke 3 to the respectice "anodes" of semiconductor controllable rectifier devices 4 and 5. The respective "cathodes" of these devices are connected to respectice terminals of a primary winding 6 of an output transformer, the centre tapping on this primary winding being connected to the terminal 2. The secondary winding of the transformer, indicated by the reference 7, is connected to a load 8. A commutating capacitor 9 is connected across the primary winding 6 of the output transformer and the circuit constitutes a conventional form of parallel inverter.

In addition to the basic components of the inverter already referred to, across the controllable semiconductor rectifier device 4 there is connected a current path including a diode 10 and a winding of a small saturable reactor 11, the polarity of the diode 11 being such as to be blocking forward voltages across the device 4. A similar arrangement of a small saturable reactor 13 and a series diode 12, is connected across the device 5 as shown, and a bias current for the saturable reactors is derived from a supply source via an impedance 14.

Considering the manner of operation of the circuit shown in FIG. 7 of the drawings, the basic inverter formed by the centre tapped transformer and devices 4 and 5 in conjunction with the commutating capacitor 9, operates in known manner and need not be discussed in detail herein. However, it will be recalled for this type of inverter that assuming the device 4 is conducting, a voltage of approximately twice the supply voltage is established across the transformer primary winding 6 and across the commutating capacitor 9. Subsequent triggering of the device 5 connects the capacitor 9 across the device 4 and since the polarity of the charge on 9 is such as to oppose the voltage applied to 4 from the source, the device 4 is biased into a non-conducting condition. Assuming that the charge on the capacitor is sufficiently large, the biased condition continues for a sufficient time for the device 4 to regain its forward blocking capability. Thereafter the conly conduction which occurs is via the device 5, until the point when the device 4 is again triggered to commutate the device 5 in a similar manner.

Assuming that load 8 reduces full load current in 4 and 5, then the capacitor 9 will have been discharged in the short time for the devices 4 and 5 to acquire their forward blocking ability. Then the charge on the capacitor 9 does not substantially increase the output voltage. However, when the load current is reduced, and without the preventive measures described, the capacitor normally takes a considerably longer time to discharge and results in higher output voltage. Therefore, a substantial change of output voltage may be experienced with varying loads.

By setting the bias ampere-turns on the saturable reactors to develop saturation flux density in one direction, say $-B_S$, then when the commutating capacitor is connected across device 4 (or 5) the saturable reactor 11 (or 13) will support the capacitor voltage for a certain time before it becomes saturated in the opposite direction. This is arranged to be equal to or somewhat longer than the time required for devices 4 and 5 to acquire their forward blocking ability. When the core saturates in the $+B_S$ direction a half-sinusoidal pulse of current will flow from capacitor 9 through the resonant circuit formed by capacitor 9 and the saturated inductance of the saturable reactor 11 (13), resulting in a reversal of capacitor voltage.

A small resistor connected in series with the saturable reactor (13) and the diode 10 (or 12) may be necessary to introduce losses in reversing the capacitor voltage to prevent a build-up of capacitor voltage which could occur in some types of commutation circuit.

Although the invention has been described in the foregoing as having application to converters and inverters, the invention is not limited to such applications. Indeed, the invention may be applicable to many circuits employing "chopper" techniques and the advantages set forth earlier may be obtained without any increase in the size of commutation capacitor required for commutating full-load current or any decrease in circuit efficiency at full-load.

Having thus described my invention what I claim is:

1. A control circuit arrangement for a current switching device located in a supply path between a source and a load, said switching device being of a type which is rendered conducting upon the application of a switching signal thereto and which is rendered non-conducting upon the application of a reverse voltage thereto, said arrangement comprising a first selectively conductive path which is rendered conductive to apply said reverse voltage to said device and which includes a capacitor for storing said reverse voltage, and a second selectively conductive path including interval timing means for timing an interval coexistent with and longer than the period required for said reverse voltage to render said device non-conducting, and for rendering said second path conductive at the end of said interval and after the end of said period so as to dissipate charge from said capacitor.

2. An arrangement as claimed in claim 1, wherein said interval timing means comprises a saturable reactor.

3. An arrangement as claimed in claim 2, further comprising means comprising a resetting winding for resetting said saturable reactor.

4. An arrangement as claimed in claim 2 further comprising a rectifier device connected in series with the saturable reactor.

5. An arrangement as claimed in claim 3 including means for deriving a bias current for said resetting winding from said source.

6. An arrangement as claimed in claim 3, wherein the charging path through which the commutating capacitor attains its charge for producing said reverse bias includes said resetting winding.

7. An arrangement as claimed in claim 1 wherein said interval timing means begins the timing of said interval responsive to said first path being rendered conductive.

References Cited

UNITED STATES PATENTS 3,354,322   11/1967   Eastop _____ 307—252

DONALD D. FORRER, Primary Examiner

J. D. FREW, Assistant Examiner

U.S. Cl. X.R.

307—305